(12) United States Patent
Tanaka et al.

(10) Patent No.: US 10,801,607 B2
(45) Date of Patent: Oct. 13, 2020

(54) INTERNAL COMBUSTION ENGINE FOR A SADDLE RIDING VEHICLE

(71) Applicant: HONDA MOTOR CO., LTD., Minato-ku, Tokyo (JP)

(72) Inventors: Kazuma Tanaka, Wako (JP); Nozomi Okada, Wako (JP); Isao Azumagakito, Wako (JP); Shigeru Awazu, Wako (JP); Naoya Matsunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 15/896,624

(22) Filed: Feb. 14, 2018

(65) Prior Publication Data

US 2018/0283528 A1 Oct. 4, 2018

(30) Foreign Application Priority Data

Mar. 30, 2017 (JP) ................................. 2017-068852

(51) Int. Cl.
*F16H 57/04* (2010.01)
*F02B 61/02* (2006.01)
(Continued)

(52) U.S. Cl.
CPC .......... *F16H 57/0424* (2013.01); *F01M 1/02* (2013.01); *F02B 61/02* (2013.01); *F02B 61/06* (2013.01);
(Continued)

(58) Field of Classification Search
CPC . F01M 1/02; F02B 61/06; F02B 75/16; F02B 61/02; F16H 57/0424; F02F 7/0058
See application file for complete search history.

(56) References Cited

U.S. PATENT DOCUMENTS

| 7,124,732 B2 | 10/2006 | Sugamuna et al. |
| 7,942,645 B2 | 5/2011 | Nakatsuka et al. |

(Continued)

FOREIGN PATENT DOCUMENTS

| JP | 2001-140614 A | 5/2001 |
| JP | 2003-239714 A | 8/2003 |
| JP | 2004-084603 A | 3/2004 |
| JP | 2005-163570 A | 6/2005 |

(Continued)

OTHER PUBLICATIONS

Extended European search report dated Jun. 7, 2018 issued in the corresponding EP application 18158301.4.
(Continued)

*Primary Examiner* — Kevin A Lathers
(74) *Attorney, Agent, or Firm* — Carrier Blackman Associates, P.C.; Joseph P. Carrier; William D. Blackman

(57) ABSTRACT

In an internal combustion engine for a saddle riding vehicle, in which a gear transmission and a shift drum of a shift change device is stored in a crankcase, the gear transmission having a plurality of transmission shafts parallel to a crankshaft extending in a vehicle width direction, a single pump shaft common to first and second oil pumps is rotatably supported by the crankcase. First oil pump rotors of the first oil pump are disposed at a mating face of a pair of left and right crankcase half bodies. A second oil pump rotor of the second oil pump is disposed between a pump gear and the first oil pump and at a side surface, on a side opposite to the mating face, of one crankcase half body out of the pair of left and right crankcase half bodies, the pump gear being arranged in the pump shaft.

12 Claims, 8 Drawing Sheets

(51) Int. Cl.
*F02F 7/00* (2006.01)
*F01M 1/02* (2006.01)
*F01M 1/12* (2006.01)
*F02B 61/06* (2006.01)
*F02B 75/16* (2006.01)

(52) U.S. Cl.
CPC ............ *F02B 75/16* (2013.01); *F02F 7/0058* (2013.01); *F02F 7/0068* (2013.01); *F16H 57/0475* (2013.01); *F01M 2001/0269* (2013.01); *F01M 2001/0284* (2013.01); *F01M 2001/123* (2013.01)

(56) References Cited

U.S. PATENT DOCUMENTS

| | | |
|---|---|---|
| 9,163,598 B2 | 10/2015 | Ono et al. |
| 2010/0072018 A1* | 3/2010 | Tsukada ................. F16D 21/06 192/48.611 |
| 2016/0281554 A1 | 9/2016 | Hatae et al. |

FOREIGN PATENT DOCUMENTS

| | | |
|---|---|---|
| JP | 2009-121326 A | 6/2009 |
| JP | 2013-204517 A | 10/2013 |
| JP | 2016-186252 A | 10/2016 |

OTHER PUBLICATIONS

Official Communication issued in the corresponding Japanese Patent Application No. 2017-068852, dated Jan. 9, 2019.

* cited by examiner

INTERNAL COMBUSTION ENGINE FOR A SADDLE RIDING VEHICLE

BACKGROUND OF THE INVENTION

Field of the Invention

The present invention relates to an internal combustion engine for a saddle riding vehicle, in which a crankshaft extending in a vehicle width direction is rotatably supported by a crankcase including a pair of left and right crankcase half bodies that are dividable in the vehicle width direction, and a gear transmission and a shift change device are disposed behind the crankshaft in a vehicle longitudinal direction, the gear transmission having a plurality of transmission shafts and being stored in the crankcase, the transmission shafts being parallel to the crankshaft, the shift change device being configured to switch a gear shift stage of the gear transmission and having a shift drum as one constituent of the shift change device, the shift drum being stored in the crankcase.

Description of the Related Art

Such an internal combustion engine has been already known in Japanese Patent Application Laid-open No. 2016-186252.

However, according to one disclosed in Japanese Patent Application Laid-open No. 2016-186252, a scavenging pump is disposed at a position corresponding to a mating face of a pair of left and right crankcase half bodies, whereas a feed pump is disposed at a position corresponding to an outer side surface of the left crankcase half body out of the pair of left and right crankcase half bodies, and a pump gear is arranged on a pump shaft so that the scavenging pump is sandwiched between the pump gear and the feed pump. Therefore, a shaft length of the pump shaft is comparatively long, and it is required to shorten the shaft length of the pump shaft in order to achieve downsizing of an engine body including a crankcase.

SUMMARY OF THE INVENTION

The object of the present invention is to provide an internal combustion engine for a saddle riding vehicle capable of contributing to downsizing of an engine body by enabling compact arrangement of a pair of oil pumps and shortening of a shaft length of a pump shaft.

In order to achieve the object, according to a first feature of the present invention, there is provided an internal combustion engine for a saddle riding vehicle, in which a crankshaft extending in a vehicle width direction is rotatably supported by a crankcase including a pair of left and right crankcase half bodies that are dividable in the vehicle width direction, and a gear transmission and a shift change device are disposed behind the crankshaft in a vehicle longitudinal direction, the gear transmission having a plurality of transmission shafts and being stored in the crankcase, the transmission shafts being parallel to the crankshaft, the shift change device being configured to switch a gear shift stage of the gear transmission and having a shift drum as one constituent of the shift change device, the shift drum being stored in the crankcase, wherein a single pump shaft is disposed between the crankshaft and the shift drum in the vehicle longitudinal direction while having an axis parallel to the crankshaft and is rotatably supported by the crankcase, the pump shaft being common to first and second oil pumps, first oil pump rotors included in the first oil pump are disposed at a mating face of the pair of left and right crankcase half bodies, and a second oil pump rotor included in the second oil pump is disposed between a pump gear and the first oil pump and at a side surface, on a side opposite to the mating face, of one crankcase half body out of the pair of left and right crankcase half bodies, the pump gear being arranged in the pump shaft so as to transmit power from the crankshaft.

With the first feature of the present invention, the first oil pump rotor is disposed at the mating face of the pair of left and right crankcase half bodies, and the second oil pump rotor is disposed between the pump gear and the first oil pump and at the side surface, on the side opposite to the mating face, of the one crankcase half body, the pump gear being arranged on the pump shaft. Therefore, the shaft length of the pump shaft can be shortened by disposing the first and second oil pump rotors as close as possible to each other which can contribute to downsizing of the engine body.

According to a second feature of the present invention, in addition to the first feature, the plurality of first oil pump rotors are disposed so as to be arrayed in an axial direction of the pump shaft and to straddle the mating face.

With the second feature of the present invention, the plural first oil pump rotors are disposed so as to be arrayed in the axial direction of the pump shaft and to straddle the mating face of the pair of left and right crankcase half bodies. Therefore, while achieving downsizing of the first oil pump rotor, the volume of the pump chamber of the first oil pump can be increased and the pump efficiency can be improved.

According to a third feature of the present invention, in addition to the second feature, the plurality of first oil pump rotors are cantilever-supported by the pump shaft, the pump shaft being rotatably supported by the one crankcase half body out of the pair of left and right crankcase half bodies, an end portion of the pump shaft on the other crankcase half body side being a free end.

With the third feature of the present invention, the plural first oil pump rotors are cantilever-supported by the pump shaft, the pump shaft being rotatably supported by the one crankcase half body. Therefore, even when the assembling error between the pair of left and right crankcase half bodies may be transmitted to the pump shaft through the first and second oil pump rotors, since the end portion of the pump shaft on the other crankcase half body side is a free end, the bearing accuracy of the pump shaft at the one crankcase half body can be improved which can contribute to improvement of the life of the bearing.

According to a fourth feature of the present invention, in addition to any one of the first feature to the third feature, the shift change device includes the shift drum, a shift spindle, and a feeding mechanism, the shift spindle being capable of rotating around an axis parallel to an axis of the shift drum, the feeding mechanism being configured to intermittently rotate the shift drum according to rotation of the shift spindle while having a shift arm and being disposed on an outer side of the crankcase, a base end portion of the shift arm being fixed to the shift spindle, and a tip end portion of the shift arm is disposed between the pump gear and the second oil pump in a direction along an axis of the pump shaft while overlapping with the second oil pump as seen from a direction along the axis of the pump shaft.

With the fourth feature of the present invention, the tip end portion of the shift arm is disposed between the pump gear and the second oil pump in the direction along the axis of the pump shaft while overlapping with the second oil pump as viewed from the direction along the axis of the pump shaft, the shift arm configuring a part of the feeding mechanism, the feeding mechanism configuring the shift change device along with the shift drum and being disposed outside the crankcase. Therefore, the feeding mechanism can be made close to the second oil pump in the direction orthogonal to the axis of the pump shaft, and downsizing of the engine body can be achieved.

According to a fifth feature of the present invention, in addition to the fourth feature, a pump case of the second oil pump is configured with the one crankcase half body and a pump cover fastened to the one crankcase half body, and an escaping recessed portion is formed in the pump cover in order to avoid interference with a member forming a part of the feeding mechanism, at a portion corresponding to the tip end portion of the shift arm.

With the fifth feature of the present invention, in the pump cover configuring a part of the pump case of the second oil pump, the escaping recessed portion is formed, the escaping recessed portion avoiding interference with a member at a portion corresponding to the tip end portion of the shift arm, the member forming a part of the feeding mechanism. Therefore, the feeding mechanism can be made close to the second oil pump in the direction along the axis of the pump shaft, and further downsizing of the engine body can be achieved.

According to a sixth feature of the present invention, in addition to the fifth feature, a relief valve arranged between the second oil pump rotor and the pump gear in the axial direction of the pump shaft is disposed in the pump cover.

With the sixth feature of the present invention, the relief valve of the second oil pump is provided in the pump cover so as to be disposed between the second oil pump rotor and the pump gear in the axial direction of the pump shaft. Therefore, the shift arm and the relief valve can be disposed compactly in a substantially same way in the direction along the axis of the pump shaft which can contribute to downsizing of the engine body.

According to a seventh feature of the present invention, in addition to any one of the first feature to the third feature, a power generator chamber for storing a power generator connected to the crankshaft is formed between a power generator cover and the other crankcase half body, the power generator cover being joined, from a side opposite to the one crankcase half body, to the other crankcase half body out of the pair of left and right crankcase half bodies, and a relief passage is formed in the other crankcase half body at a side of the first oil pump served as a scavenging pump, the relief passage being for guiding excess oil from the first oil pump to the power generator chamber side.

With the seventh feature of the present invention, the power generator chamber is formed between the other crankcase half body and the power generator cover, the power generator cover being joined to the other crankcase half body, and the relief passage is formed in the other crankcase half body at the side of the first oil pump, the relief passage being for leading the excess oil from the first oil pump to the power generator chamber side, the first oil pump being a scavenging pump. Therefore, the relief passage can be shortened.

According to an eighth feature of the present invention, in addition to the fifth feature or the sixth feature, an oil filter is disposed in a crankcase cover joined to the one crankcase half body while covering the one crankcase half body, and a passage for guiding oil to the oil filter is formed in the pump cover of the second oil pump served as a feed pump.

With the eighth feature of the present invention, the oil filter is disposed in the crankcase cover, the crankcase cover being joined to the one crankcase half body, and the passage is formed in the pump cover of the second oil pump, the passage guiding oil to the oil filter, the second oil pump being a feed pump. Therefore, by optimizing the passage structure between the second oil pump and the oil filter, downsizing of the engine body can be achieved.

The above and other objects, characteristics and advantages of the present invention will be clear from detailed descriptions of the preferred embodiment which will be provided below while referring to the attached drawings.

DESCRIPTION OF THE PREFERRED EMBODIMENT

Embodiments of the present invention will be explained referring to FIG. 1 to FIG. 8 attached. Also, in the explanation described below, up, down, front, rear, left, and right are directions when viewed by an occupant riding a two-wheeled motor vehicle.

Figure 1:
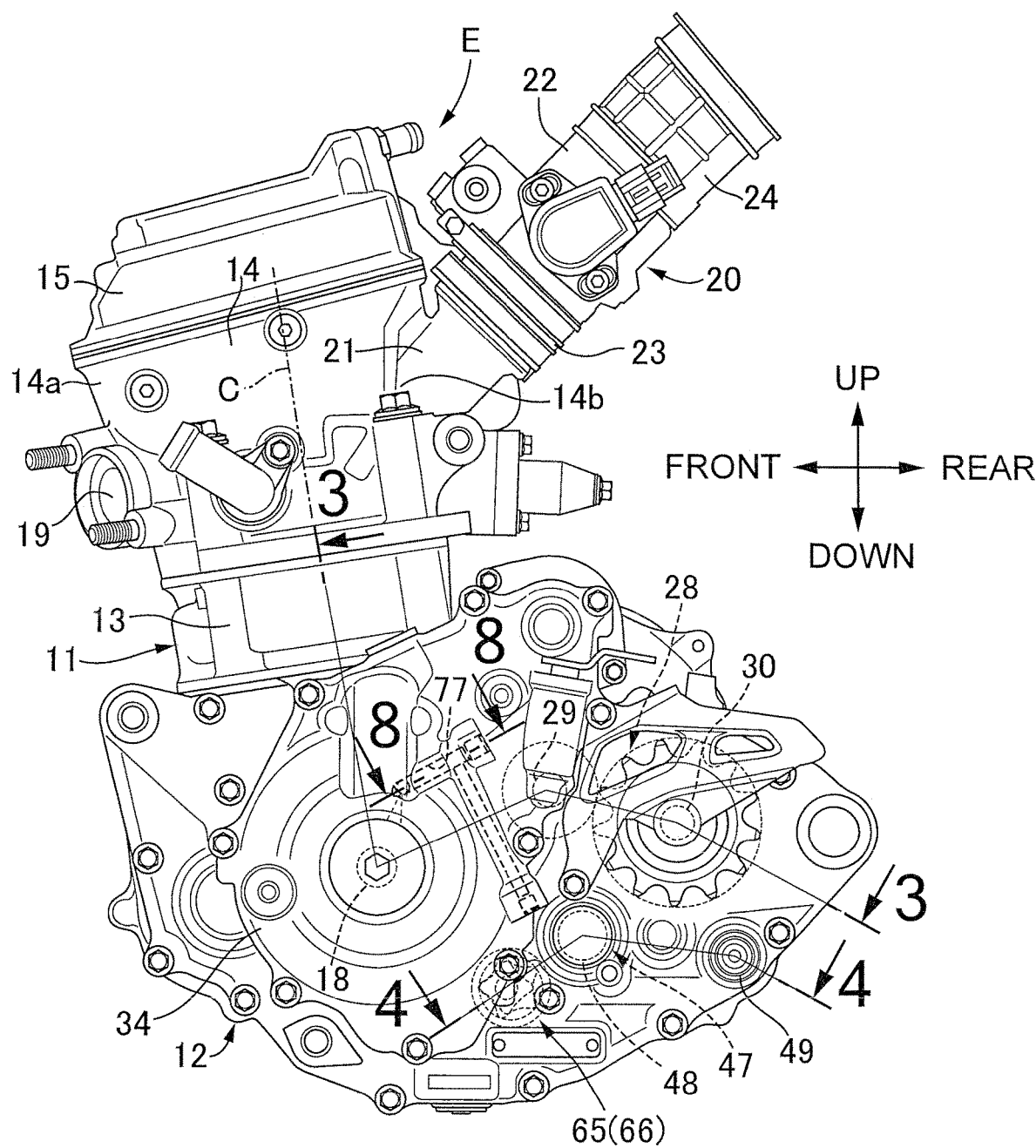
FIG. 1 is a side view that shows an engine body of an internal combustion engine from the left side.
Figure 2:
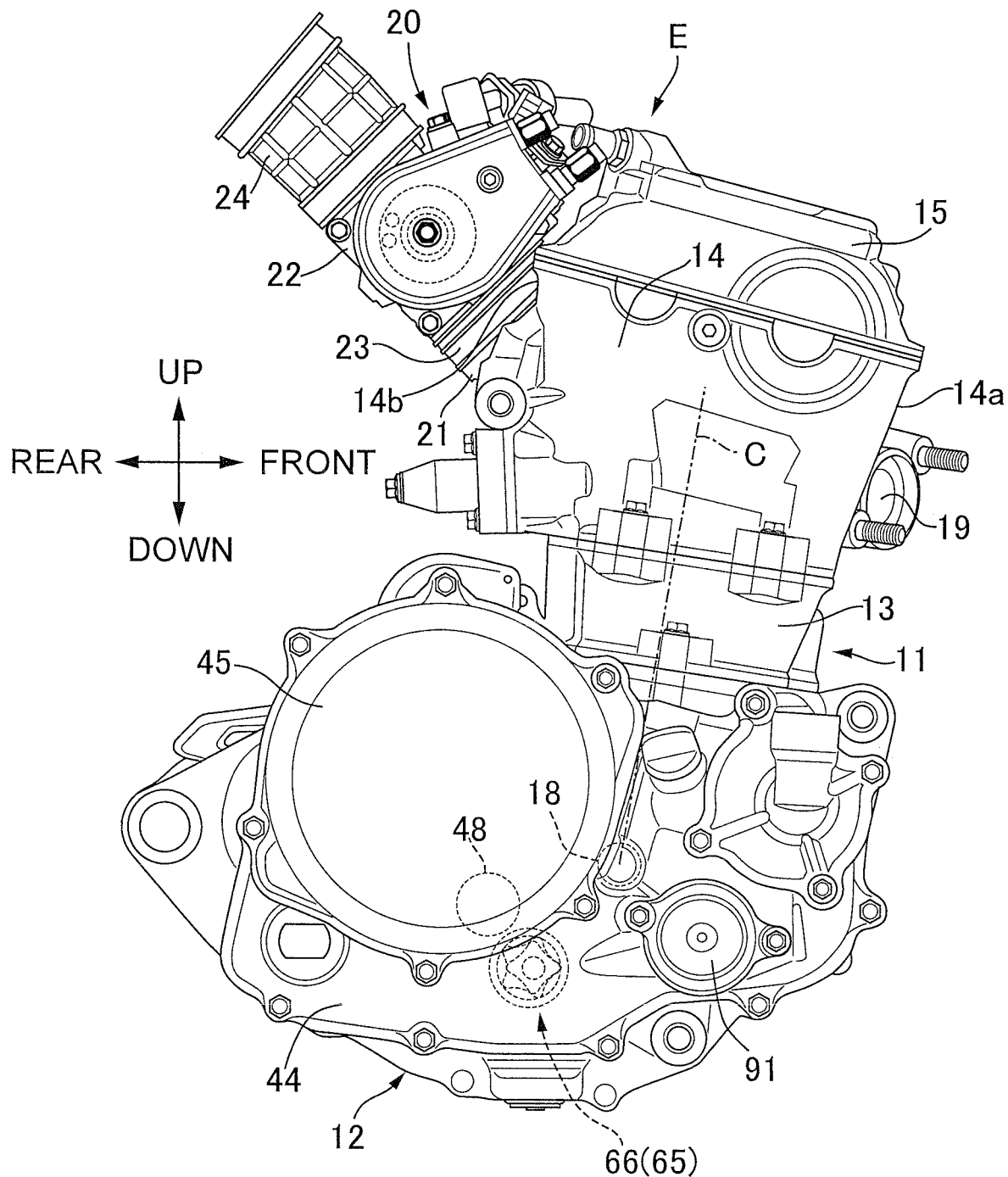
FIG. 2 is a side view that shows the engine body from the right side.

First, in FIG. 1 and FIG. 2, an engine body 11 of a single cylinder internal combustion engine E mounted on a saddle riding vehicle, for example, a two-wheeled motor vehicle includes a crankcase 12, a cylinder body 13, a cylinder head 14, and a head cover 15, and is mounted on the two-wheeled motor vehicle with an attitude of slightly tilting a cylinder axis C forward, the crankcase 12 rotatably supporting a crankshaft 18 that extends in the vehicle width direction, the cylinder body 13 being joined to the upper portion on the front side of the crankcase 12 so as to stand upward from the crankcase 12, the cylinder head 14 being joined to the upper part of the cylinder body 13, the head cover 15 being joined to the upper part of the cylinder head 14.

A pair of left and right exhaust ports 19 are arranged in the cylinder head 14, the pair of left and right exhaust ports 19 opening to a front wall 14a of the cylinder head 14, and the upstream end portion of an exhaust system (not illustrated) of the internal combustion engine E is connected to the exhaust ports 19. Also, an intake connection tube portion 21 is protrusively provided obliquely upward to the rear on a rear wall 14b of the cylinder head 14, the intake connection tube portion 21 forming a single intake port (not illustrated), and an intake system 20 of the internal combustion engine E includes a throttle body 22, an insulator 23, a connecting tube 24, and an air cleaner (not illustrated), the throttle body 22 adjusting the air volume that is supplied to the intake port, the insulator 23 connecting the intake connection tube portion 21 and the throttle body 22 to each other, the downstream end of the connecting tube 24 being connected to the upstream end of the throttle body 22, the upstream end of the connecting tube 24 being connected to the air cleaner.

Figure 3:
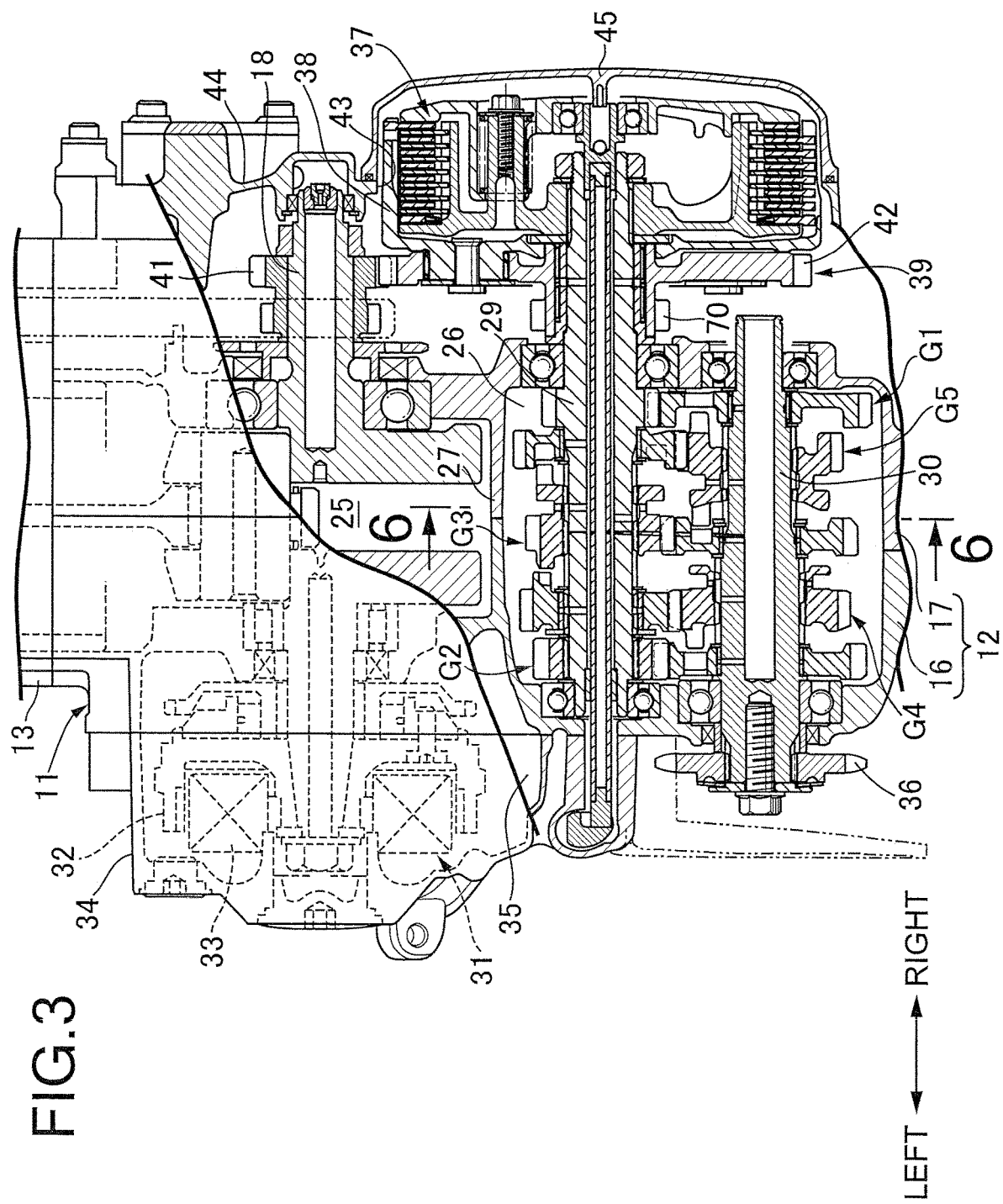
FIG. 3 is a sectional view taken along the line 3-3 of FIG. 1.

In FIG. 3, the crankcase 12 includes a pair of left and right crankcase half bodies 16, 17 that can be split in the vehicle width direction, and the crankshaft 18 is rotatably supported by the crankcase 12, the crankshaft 18 having the axis that extends in the vehicle width direction.

Inside the crankcase 12, a crank chamber 25 and a transmission chamber 26 are formed so as to interpose a separation wall 27 therebetween, the crank chamber 25 storing the main portion of the crankshaft 18, and a gear transmission 28 is stored in the transmission chamber 26 while being disposed behind the crankshaft 18 in a vehicle longitudinal direction as shown in FIG. 1, the gear transmission 28 including an input side transmission shaft 29 and an output side transmission shaft 30, the input side transmission shaft 29 and the output side transmission shaft 30 being plural transmission shafts that are parallel to the crankshaft 18.

A power generator 31 is connected to the left side end portion along the axis of the crankshaft 18, the power generator 31 being driven by the crankshaft 18. Also, a clutch 37 is disposed on the right side along the axis of the crankshaft 18, the clutch 37 being interposed between the crankshaft 18 and the gear transmission 28.

The power generator 31 includes a rotor 32 and a stator 33, the rotor 32 being fixed to the crankshaft 18, the stator 33 being disposed inside the rotor 32, the stator 33 is fixed to a power generator cover 34, the power generator cover 34 being joined to the left crankcase half body 16 of the crankcase 12 so as to cover the power generator 31, and a power generator chamber 35 is formed between the left crankcase half body 16 and the power generator cover 34.

The gear transmission 28 is formed by arranging gear trains with plural gear shift stages, for example, first to fifth speed gear trains G1, G2, G3, G4, G5 capable of being selectively established between the input side transmission shaft 29 and the output side transmission shaft 30, the input side transmission shaft 29 having the axis parallel to the crankshaft 18 and being rotatably supported by the left and right crankcase half bodies 16, 17, the output side transmission shaft 30 having the axis parallel to the input side transmission shaft 29 and being rotatably supported by the left and right crankcase half bodies 16, 17, and a cam chain driving sprocket 36 is fixed to the protruding end portion of the output side transmission shaft 30 from the left crankcase half body 16.

The right end portions in the vehicle width direction of the crankshaft 18 and the input side transmission shaft 29 protrude from the right crankcase half body 17 of the crankcase 12, the clutch 37 is furnished at the right end portion of the input side transmission shaft 29, the clutch 37 switching connection/disconnection of the power between the crankshaft 18 and the input side transmission shaft 29, and the rotational power of the crankshaft 18 is transmitted to a clutch outer 38 of the clutch 37 through a primary speed reducer 39 and a damper (not illustrated). The primary speed reducer 39 includes a primary driving gear 41 and a primary driven gear 42, the primary driving gear 41 being fixed to the right end portion of the crankshaft 18, the primary driven gear 42 being supported by the input side transmission shaft 29 in a relatively rotatable manner so as to mesh with the primary driving gear 41, and the primary driven gear 42 is connected to the clutch outer 38 through the damper, the clutch outer 38 being supported by the input side transmission shaft 29 in a relatively rotatable manner.

A crankcase cover 44 is fastened to the right crankcase half body 17, the crankcase cover 44 including an opening portion 43 and covering a part of the primary speed reducer 39, a part of the clutch 37 facing the opening portion 43, and a clutch cover 45 is fastened to the crankcase cover 44 so as to close the opening portion 43, the clutch cover 45 covering the clutch 37.

Figure 4:
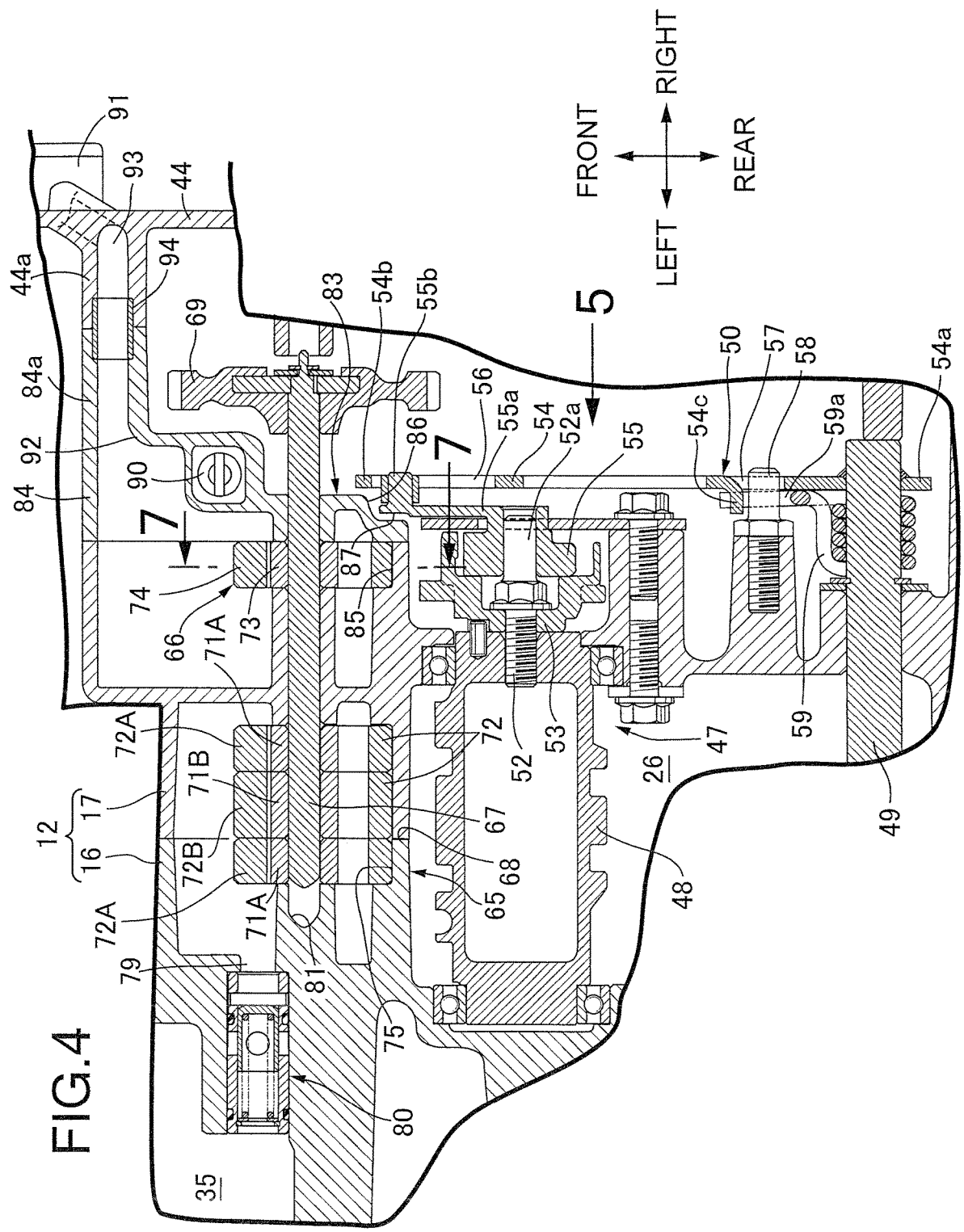
FIG. 4 is a sectional view taken along the line 4-4 of FIG. 1.
Figure 5:
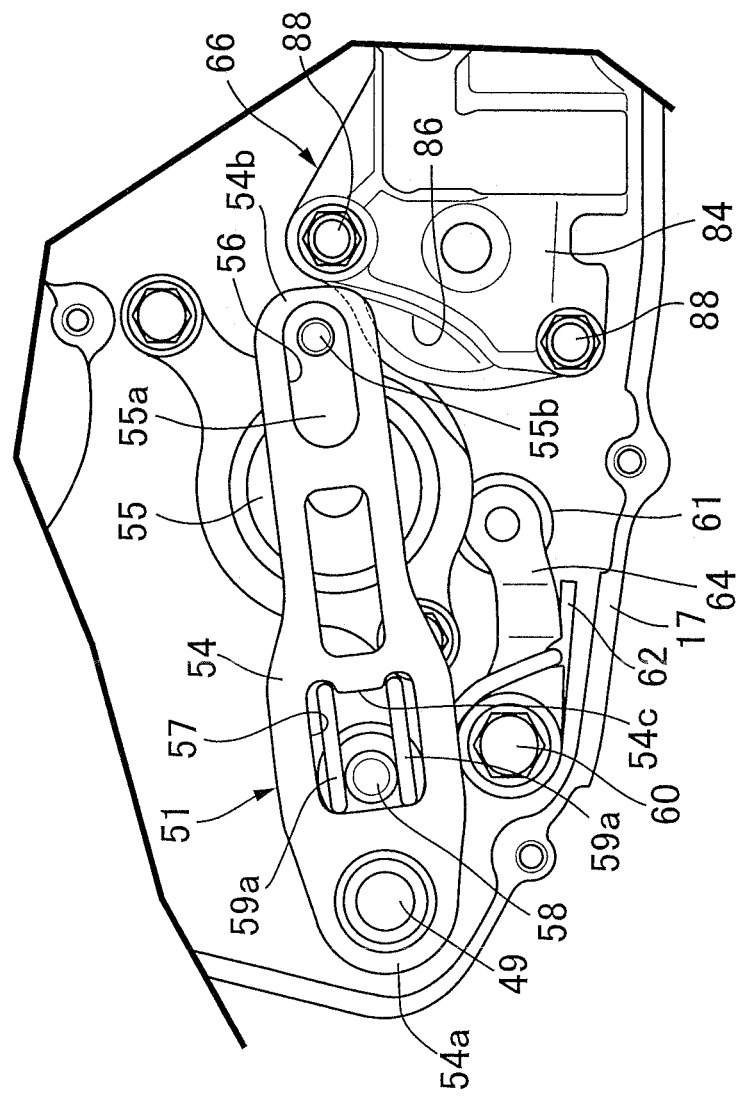
FIG. 5 is a drawing as viewed along the arrow 5 of FIG. 4.

With reference also to FIG. 4 and FIG. 5, the gear shift stage of the gear transmission 28 is switched by a shift change device 47 that includes a shift drum 48 as one of the constituents, the shift drum 48 being stored in the transmission chamber 26 of the crankcase 12, and this shift change device 47 is disposed behind the crankshaft 18 in the vehicle longitudinal direction as shown in FIG. 1.

The shift change device 47 includes the shift drum 48, a shift spindle 49, and a feeding mechanism 50, opposite end portions of the shift drum 48 being rotatably supported by the left and right crankcase half bodies 16, 17 of the crankcase 12, the shift spindle 49 being capable of rotating around an axis parallel to the axis of the shift drum 48, the feeding mechanism 50 being configured to intermittently rotate the shift drum 48 according to rotation of the shift spindle 49 while including a shift arm 51 and being disposed outside the crankcase 12, the base end portion of the shift arm 51 being fixed to the shift spindle 49.

The shift spindle 49 is rotatably supported by the left and right crankcase half bodies 16, 17 so that the end portion on the left side in the vehicle width direction of the shift spindle 49 protrudes outward from the left crankcase half body 16.

The feeding mechanism 50 includes a drum center 53, a shift arm 54, a drum shifter 55, and an intermittently driving unit (not illustrated), the drum center 53 being formed into a bowl shape opening to a side opposite to the shift drum 48 and being fixed coaxially to the end portion on the right side in the vehicle width direction of the shift drum 48 by a bolt 52, a base end portion 54a of the shift arm 54 being fixed to the protruding portion of the shift spindle 49 from the right crankcase half body 17, the shift arm 54 extending to the shift drum 48 side along the radial direction of the shift spindle 49, the drum shifter 55 being rotatably ably supported by a pivot portion 52a, the bolt 52 coaxially and integrally including the pivot portion 52a, a part of the drum shifter 55 being stored inside the drum center 53, the intermittently driving unit being arranged between the drum shifter 55 and the drum center 53 so as to intermittently rotate the drum center 53 and the shift drum 48 according to rotation of the drum shifter 55.

An engaging hole 56 having a long hole shape is formed at a portion closer to a tip end portion 54b of the shift arm 54. Also, an arm portion 55a is integrally arranged in the drum shifter 55, the arm portion 55a extending to the tip end portion 54b side of the shift arm 54 beyond the drum center 53, and an engaging pin 55b is inserted to the engaging hole 56, the engaging pin 55b being arranged at the tip end portion of the arm portion 55a. Thus, according to rotation the shift arm 54 along with the shift spindle 49, the drum shifter 55 also rotates.

Also, an opening portion 57 having a rectangular shape is formed at a part closer to the base end portion 54a of the shift arm 54, and a pin 58 is implanted in the part, the pin 58 being inserted to the opening portion 57. Meanwhile, a projection portion 54c is protrusively provided integrally in the shift arm 54, the projection portion 54c protruding to the right crankcase half body 17 side from the side edge of the opening portion 57 on the side opposite to the shift drum 48, and a sandwiching spring 59 is disposed between the shift arm 54 and the right crankcase half body 17 so as to surround the shift spindle 49, the sandwiching spring 59 including a pair of sandwiching arm portions 59a, 59a at opposite ends, the pair of sandwiching arm portions 59a, 59a sandwiching the pin 58 and the projection portion 54c from opposite sides. Even if the shift spindle 49 and the shift arm 54 may rotate to either direction, when a force applied to the shift spindle 49 is released, the shift spindle 49 and the shift arm 54 are returned to the neutral position by a spring force exerted by the sandwiching spring 59.

Also, the base end portion of an arm 64 is rotatably supported by a pivot 60 that is arranged in the right crankcase half body 17 in the vicinity of the shift spindle 49, a roller 61 is pivotally supported by the tip end portion of the arm 64, the roller 61 being engaged with recessed portions (not illustrated) selectively, the recessed portion being formed in the outer periphery of the drum center 53 corresponding respectively to the first to fifth gear shift stages established by the gear transmission 28, and this arm 64 is energized by a twist spring 62 so as to rotate in the direction in which the roller 61 is made engage with one of the recessed portions in the outer periphery of the drum center 53, the twist spring 62 surrounding the pivot 60.

Figure 6:
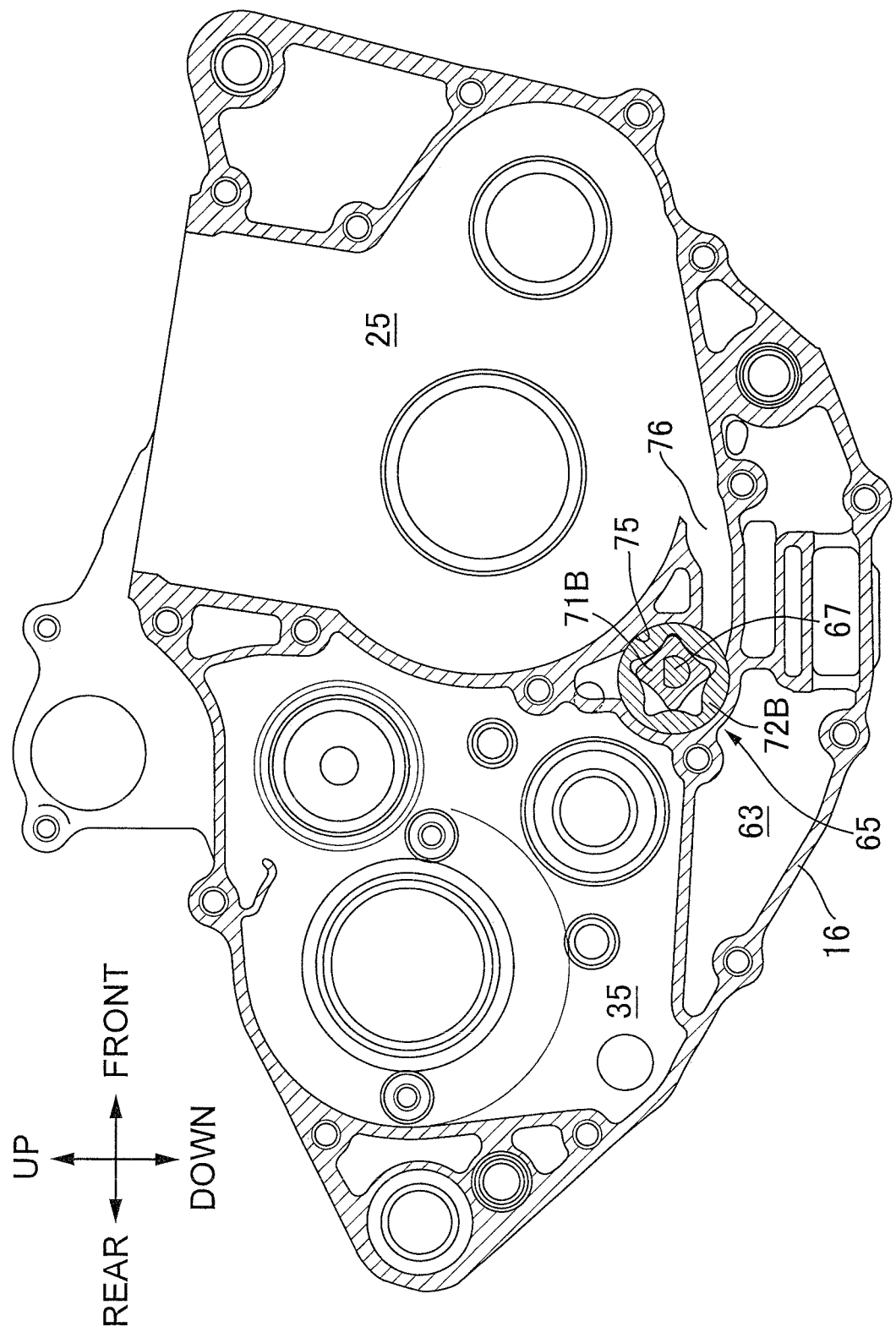
FIG. 6 is a sectional view taken along the line 6-6 of FIG. 3 in a state of omitting a gear transmission.
Figure 7:
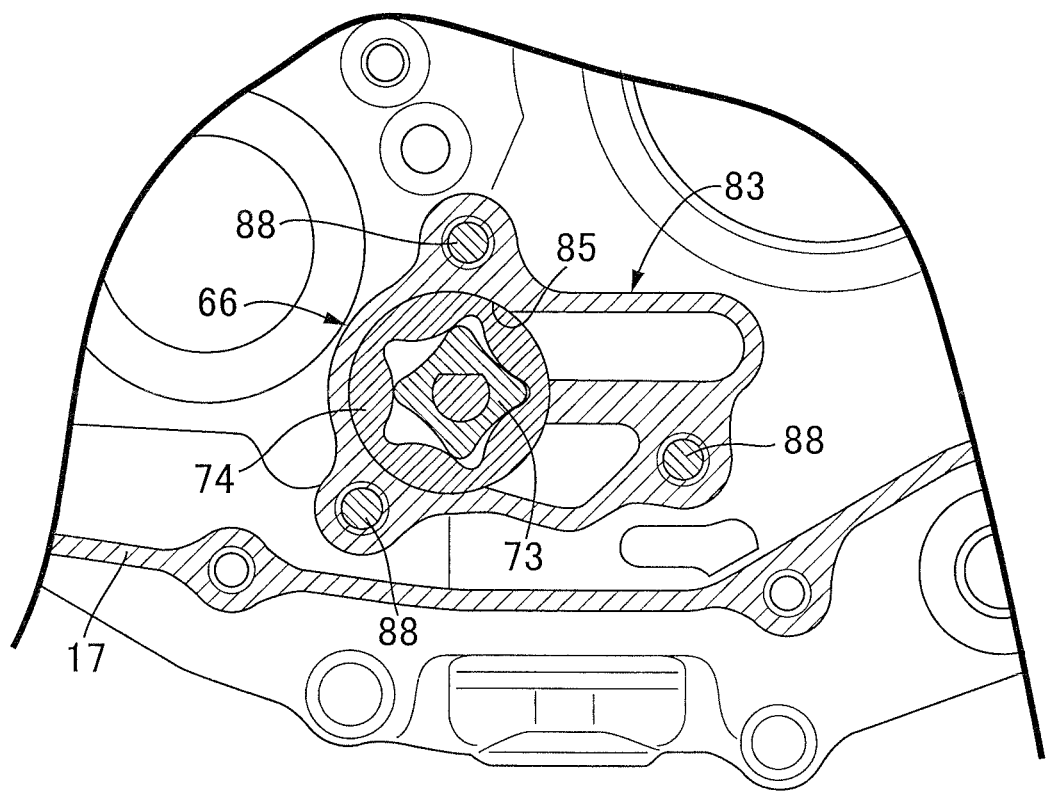
FIG. 7 is a sectional view taken along the line 7-7 of FIG. 4.

With reference also to FIG. 6 and FIG. 7, an oil pool 63 is formed at the lowermost portion of the crankcase 12, the oil pool 63 communicating with the lower portion of the power generator chamber 35, and a first oil pump 65 and a second oil pump 66 are disposed in the lower portion of the crankcase 12, the first oil pump 65 being a scavenging pump that sucks oil within the crank chamber 25 and supplies the oil to the upper portion within the power generator chamber 35, the second oil pump 66 being a feed pump that supplies the oil sucked up from the oil pool 63 through an oil strainer (not illustrated) to each portion of the engine body 11.

The first and second oil pumps 65, 66 are driven by a common single pump shaft 67, and the pump shaft 67 is disposed between the crankshaft 18 and the shift drum 48 in the vehicle longitudinal direction while having the axis parallel to the crankshaft 18 as shown in FIG. 1 and FIG. 2, and the pump shaft 67 is rotatably supported by the crankcase 12.

A pump gear 69 arranged on the pump shaft 67 is disposed between the right crankcase half body 17 and the primary driven gear 42 of the primary speed reducer 39, and a pump driving gear 70 (refer to FIG. 3) rotating with the primary driven gear 42 meshes with the pump gear 69.

First inner rotors 71A, 71B and first outer rotors 72A, 72B are disposed at a mating face 68 of the left crankcase half body 16 and the right crankcase half body 17, the first inner rotors 71A, 71B being the first oil pump rotors included in the first oil pump 65, the first outer rotors 72A, 72B meshing with the first inner rotors 71A, 71B. A second inner rotor 73 and a second outer rotor 74 are disposed between the pump gear 69 and the first oil pump 65 and at the side surface of the right crankcase half body 17 on the side opposite to the mating face 68, the second inner rotor 73 being the second oil pump rotor included in the second oil pump 66, the second outer rotor 74 meshing with the second inner rotor 73, the right crankcase half body 17 being one of the pair of left and right crankcase half bodies 16, 17.

In other words, a pump chamber 75 of the first oil pump 65 is formed so as to straddle the mating face 68 between the left crankcase half body 16 and the right crankcase half body 17, a pair of the first inner rotors 71A having a same shape and the first inner rotor 71B having the axial length longer than that of the first inner rotors 71A are disposed so as to straddle the mating face 68. That is, three of the first inner rotor 71A, 71B are arrayed in the axial direction of the pump shaft 67 and stored in the pump chamber 75 so as to sandwich the first inner rotor 71B by the pair of first inner rotors 71A while one of the pair of first inner rotors 71A is stored on the left crankcase half body 16 side of the pump chamber 75. Further, a pair of the first outer rotors 72A having a same shape and the first outer rotor 72B are also stored in the pump chamber 75 with the layout corresponding to the pair of first inner rotors 71A and the first inner rotor 71B, the pair of first outer rotors 72A meshing with the pair of first inner rotors 71A, the first outer rotor 72B meshing with the first inner rotor 71B.

Figure 8:
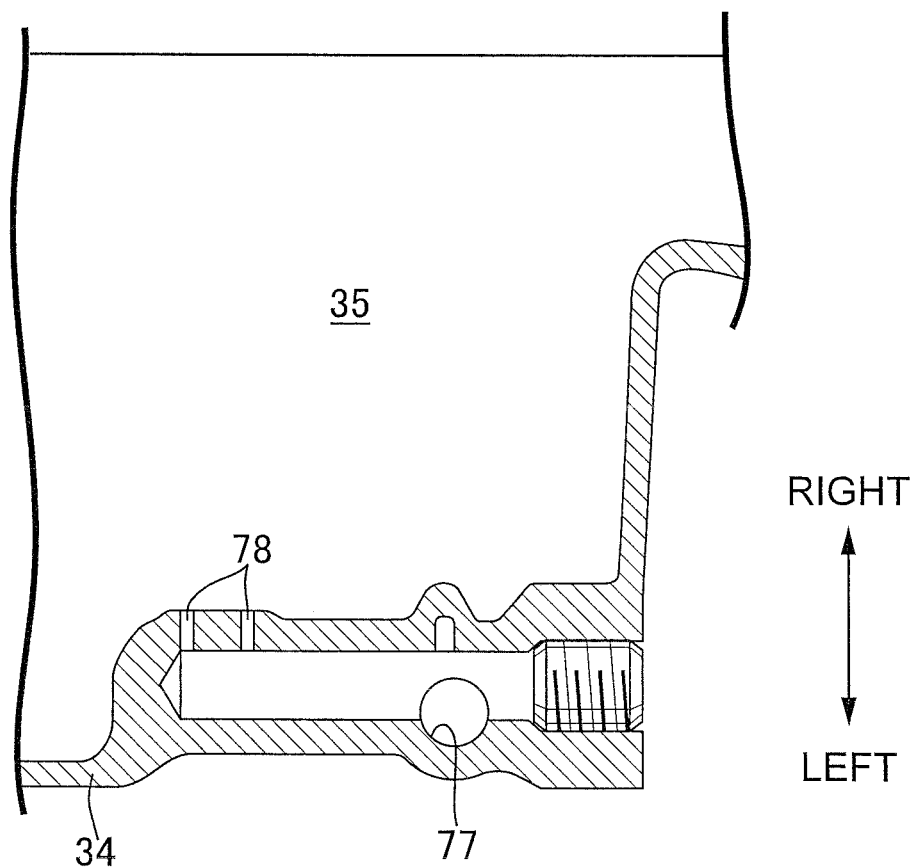
FIG. 8 is a sectional view taken along the line 8-8 of FIG. 1.

Also, in the lower portion of the crankcase 12, a suction passage 76 (refer to FIG. 6) is formed, the suction passage 76 guiding oil of the lower portion within the crank chamber 25 to the first oil pump 65 side. Further, a passage 77 is formed in the left crankcase half body 16 and the power generator cover 34, the passage 77 guiding oil discharged from the first oil pump 65 to the upper portion of the power generator chamber 35, and plural dripping holes 78 are formed in the power generator cover 34 as shown in FIG. 8, the dripping holes 78 communicating with the downstream side end of the passage 77 and opening downward.

Further, a relief passage 79 is formed in the left crankcase half body 16 at the side of the first oil pump 65 as shown in FIG. 4, the relief passage 79 being for guiding excess oil from the first oil pump 65 to the power generator chamber 35 side, and a relief valve 80 is furnished to this relief passage 79.

In the meantime, the pump shaft 67 is rotatably supported by the right crankcase half body 17 that is the crankcase half body on the side the second oil pump 66 is disposed out of the left crankcase half body 16 and the right crankcase half body 17, and the end portion on the left crankcase half body 16 side of the pump shaft 67 is inserted loosely to a bottomed insertion hole 81, the pump shaft 67 relatively non-rotatably penetrating the first inner rotors 71A, 71B, the insertion hole 81 being formed in the left crankcase half body 16 so as to be coaxial with the pump shaft 67. Therefore, the end portion on the left crankcase half body 16 side of the pump shaft 67 is not supported by the left crankcase half body 16 but is a free end, and the first inner rotors 71A, 71B are cantilever-supported by the pump shaft 67.

A pump case 83 of the second oil pump 66 is configured of the right crankcase half body 17 and a pump cover 84, the pump cover 84 being fastened to the right crankcase half body 17, and the second inner rotor 73 and the second outer rotor 74 are stored within a pump chamber 85 that is formed by the right crankcase half body 17 and the pump cover 84. Also, the pump shaft 67 relatively non-rotatably penetrates the second inner rotor 73 and rotatably penetrates the pump cover 84, and the pump gear 69 is fixed to the protruding step portion of the pump shaft 67 protruded from the pump cover 84.

In the meantime, the tip end portion 54b of the shift arm 54 in the feeding mechanism 50 of the shift change device 47 is disposed between the pump gear 69 and the second oil pump 66 in the direction along the axis of the pump shaft 67 as shown in FIG. 4 while overlapping with the second oil pump 66 as seen from the direction along the axis of the pump shaft 67 as shown in FIG. 5.

An escaping recessed portion 86 is formed in the pump cover 84 that configures a part of the pump case 83 of the second oil pump 66, the escaping recessed portion 86 avoiding interference with a member that forms a part of the feeding mechanism 50 at a portion corresponding to the tip end portion 54b of the shift arm 54, the member that forms a part of the feeding mechanism 50 in the present embodiment is the drum shifter 55, and the escaping recessed portion 86 is formed so as to avoid interference with the tip end portion of the arm portion 55a, the drum shifter 55 integrally including the arm portion 55a.

In the meantime, the pump cover 84 is fastened to the right crankcase half body 17 by three bolts 88 that are disposed apart in the peripheral direction, and the escaping recessed portion 86 is formed in the pump cover 84 between two bolts 88 that are adjacent to each other in the peripheral direction. Also, a recessed portion 87 is formed at the surface of the tip end portion of the arm portion 55a of the drum shifter 55, the surface facing the escaping recessed portion 86, the recessed portion 87 being obtained by making the thickness of the arm portion 55a thinner than the thickness of the other portion.

Further, a relief valve 90 is disposed in the pump cover 84 so as to return the excess portion of the oil discharged from the second oil pump 66 to the oil pool 63 side, the relief valve 90 being disposed between the second inner rotor 73 and the second outer rotor 74 and the pump gear 69 in the axial direction of the pump shaft 67.

In the meantime, an oil filter 91 is disposed at the lower portion of the crankcase cover 44, and a passage 92 is formed in the pump cover 84, the passage 92 guiding the oil to the oil filter 91. In other words, as shown in FIG. 4, a connection tube portion 84a is protrusively provided in the pump cover 84 integrally so as to protrude to the crankcase cover 44 side, the connection tube portion 84a forming the passage 92, a connection tube portion 44a is protrusively provided in the crankcase cover 44 integrally so as to protrude to the pump cover 84 side, the connection tube portion 44a forming a part of a passage 93, the passage 93 communicating with the oil filter 91, and both of the connection tube portions 84a, 44a are connected to each other through a knock pin 94 that has a cylindrical shape.

Next, the operation of the present embodiment will be explained. The single pump shaft 67 is disposed between the crankshaft 18 and the shift drum 48 in the vehicle longitudinal direction while having an axis parallel to the crankshaft 18 and is rotatably supported by the crankcase 12, the pump shaft 67 being common to the first and second oil pumps 65, 66, the first inner rotors 71A, 71B and the first outer rotors 72A, 72B are disposed at the mating face 68 of the pair of left and right crankcase half bodies 16, 17, the first inner rotors 71A, 71B and the first outer rotors 72A, 72B being included in the first oil pump 65, and the second inner rotor 73 and the second outer rotor 74 are disposed between the pump gear 69 and the first oil pump 65 and at the side surface, on the side opposite to the mating face 68, of the right crankcase half body 17, the second inner rotor 73 and the second outer rotor 74 being included in the second oil pump 66, the right crankcase half body 17 being one of the pair of left and right crankcase half bodies 16, 17, the pump gear 69 being arranged in the pump shaft 67 so as to transmit the power from the crankshaft 18. Therefore, the shaft length of the pump shaft 67 can be shortened by disposing the first inner rotors 71A, 71B and the first outer rotors 72A, 72B and the second inner rotor 73 and the second outer rotor 74 as close as possible to each other which can contribute to downsizing of the engine body 11.

Also, the plural first inner rotors 71A, 71B and first outer rotors 72A, 72B are disposed so as to be arrayed in the axial direction of the pump shaft 67 and to straddle the mating face 68. Therefore, while achieving downsizing of the first inner rotors 71A, 71B and the first outer rotors 72A, 72B, the volume of the pump chamber of the first oil pump 65 can be increased and the pump efficiency can be improved.

Further, a pair of the first inner rotors 71A having a same shape, a pair of the first outer rotors 72A having a same shape, the first inner rotor 71B, and the first outer rotor 72B are disposed so as to straddle the mating face 68, the length in the axial direction of the first inner rotor 71B and the first outer rotor 72B being made larger than that of the first inner rotors 71A and the first outer rotors 72A. Thereby, two out of three of the first inner rotors 71A, 71B can be commonalized, and two out of three of the first outer rotors 72A, 72B can be commonalized.

Also, the plural first inner rotors 71A, 71B are cantilever-supported by the pump shaft 67, the pump shaft 67 being rotatably supported by the right crankcase half body 17 out of the pair of left and right crankcase half bodies 16, 17, the end portion of the pump shaft 67 on the left crankcase half body 16 side being made a free end. Therefore, even when the assembling error between the left and right crankcase half bodies 16, 17 may be transmitted to the pump shaft 67 through the first inner rotors 71A, 71B, the first outer rotors 72A, 72B, the second inner rotor 73, and the second outer rotor 74, since the end portion of the pump shaft 67 on the left crankcase half body 16 side is a free end, the bearing accuracy of the pump shaft 67 at the right crankcase half body 17 can be improved which can contribute to improvement of the life of the bearing.

Also, the shift change device 47 includes the shift drum 48, the shift spindle 49, and the feeding mechanism 50, the shift spindle 49 being capable of rotating around an axis parallel to an axis of the shift drum 48, the feeding mechanism 50 being configured to intermittently rotate the shift drum 48 according to rotation of the shift spindle 49 while having the shift arm 54 and being disposed on the outer side of the crankcase 12, the base end portion 54a of the shift arm 54 being fixed to the shift spindle 49, and the tip end portion 54b of the shift arm 54 is disposed between the pump gear 69 and the second oil pump 66 in a direction along an axis of the pump shaft 67 while overlapping with the second oil pump 66 as seen from a direction along the axis of the pump shaft 67. Therefore, the feeding mechanism 50 can be made close to the second oil pump 66 in the direction orthogonal to the axis of the pump shaft 67, and downsizing of the engine body 11 can be achieved.

Also, the pump case 83 of the second oil pump 66 is configured of the right crankcase half body 17 and the pump cover 84, the pump cover 84 being fastened to the right crankcase half body 17, and the escaping recessed portion 86 is formed in the pump cover 84, the escaping recessed portion 86 avoiding interference with the tip end portion of the arm portion 55a of the drum shifter 55 at a portion corresponding to the tip end portion 54b of the shift arm 54, the drum shifter 55 being a member forming a part of the feeding mechanism 50. Therefore, the feeding mechanism 50 can be made close to the second oil pump 66 in the direction along the axis of the pump shaft 67, and further downsizing of the engine body 11 can be achieved.

Further, the escaping recessed portion 86 is formed in the pump cover 84 between the two bolts 88 adjacent to each other in the peripheral direction out of the three bolts 88 for fastening the pump cover 84 to the right crankcase half body 17, and the recessed portion 87 is formed at the surface, facing the escaping recessed portion 86, of the tip end portion of the arm portion 55a, the recessed portion 87 being obtained by making the thickness of the arm portion 55a thinner than the thickness of the other portion. Therefore, it is possible to avoid that the rigidity of the pump cover 84 drops due to formation of the escaping recessed portion 86.

Also, the relief valve 90 is provided in the pump cover 84, the relief valve 90 being disposed between the second inner rotor 73 and the second outer rotor 74 and the pump gear 69 in the axial direction of the pump shaft 67. Therefore, the shift arm 54 and the relief valve 90 can be disposed compactly in a substantially same way in the direction along the axis of the pump shaft 67, which can contribute to downsizing of the engine body 11.

Also, the power generator chamber 35 is formed between the left crankcase half body 16 out of the pair of left and right crankcase half bodies 16, 17 and the power generator cover 34, the power generator chamber 35 storing the power generator 31, the power generator 31 being connected to the crankshaft 18, the power generator cover 34 being joined to the left crankcase half body 16 from the side opposite to the right crankcase half body 17, and the relief passage 79 is formed in the left crankcase half body 16 at the side of the first oil pump 65, the first oil pump 65 being a scavenging pump, the relief passage 79 being for guiding excess oil from the first oil pump 65 to the power generator chamber 35 side. Therefore, the relief passage 79 can be shortened.

Further, the oil filter 91 is disposed in the crankcase cover 44, the crankcase cover 44 covering the right crankcase half body 17 and being joined to the right crankcase half body 17, and the passage 92 is formed in the pump cover 84 of the second oil pump 66, the second oil pump 65 being a feed pump, the passage 92 guiding oil to the oil filter 91. Therefore, by optimizing the passage structure between the second oil pump 66 and the oil filter 91, downsizing of the engine body 11 can be achieved.

Although the embodiment of the present invention has been explained above, the present invention is not limited to the embodiment described above, and various design changes can be effected without departing from the gist of the present invention.

For example, the present invention can be applied widely not only to an internal combustion engine for a two-wheeled motor vehicle but also to an internal combustion engine mounted on a saddle riding vehicle including a three-wheeled motor vehicle.

What is claimed is:

1. An internal combustion engine for a saddle riding vehicle, in which a crankshaft extending in a vehicle width direction is rotatably supported by a crankcase including a pair of left and right crankcase half bodies that are dividable in the vehicle width direction, and a gear transmission and a shift change device are disposed behind the crankshaft in a vehicle longitudinal direction, the gear transmission having a plurality of transmission shafts and being stored in the crankcase, the transmission shafts being parallel to the crankshaft, the shift change device being configured to switch a gear shift stage of the gear transmission and including a shift drum, a shift spindle, and a feeding mechanism, the shift drum being stored in the crankcase, wherein a single pump shaft is disposed between the crankshaft and the shift drum in the vehicle longitudinal direction while having an axis parallel to the crankshaft and is rotatably supported by the crankcase, the pump shaft being common to first and second oil pumps, a first oil pump rotor included in the first oil pump is disposed at a mating face of the pair of left and right crankcase half bodies, and a second oil pump rotor included in the second oil pump is disposed between a pump gear and the first oil pump and at a side surface, on a side opposite to the mating face, of one crankcase half body out of the pair of left and right crankcase half bodies, the pump gear being arranged in the pump shaft so as to transmit power from the crankshaft, wherein the shift spindle being configured to rotate around an axis parallel to an axis of the shift drum, the feeding mechanism being configured to intermittently rotate the shift drum according to rotation of the shift spindle while having a shift arm and being disposed on an outer side of the crankcase, a base end portion of the shift arm being fixed to the shift spindle, a pump case of the second oil pump is configured with the one crankcase half body and a pump cover fastened to the one crankcase half body, and an escaping recessed portion is formed in the pump cover in order to avoid interference with a member forming a part of the feeding mechanism, at a portion corresponding to the tip end portion of the shift arm.

2. The internal combustion engine for a saddle riding vehicle according to claim 1, including more than one said first oil pump rotor, wherein the first oil pump rotors are disposed so as to be arrayed in an axial direction of the pump shaft and to straddle the mating face.

3. The internal combustion engine for a saddle riding vehicle according to claim 2, wherein the first oil pump rotors are cantilever-supported by the pump shaft, the pump shaft being rotatably supported by the one crankcase half body out of the pair of left and right crankcase half bodies, an end portion of the pump shaft on the other crankcase half body side being a free end.

4. The internal combustion engine for a saddle riding vehicle according to claim 3, wherein the tip end portion of the shift arm is disposed between the pump gear and the second oil pump in a direction along an axis of the pump shaft while overlapping with the second oil pump as seen from a direction along the axis of the pump shaft.

5. The internal combustion engine for a saddle riding vehicle according to claim 3, wherein a power generator chamber for storing a power generator connected to the crankshaft is formed between a power generator cover and the other crankcase half body out of the pair of left and right crankcase half bodies, the power generator cover being joined, from a side opposite to the one crankcase half body, to the other crankcase half body, and a relief passage is formed in the other crankcase half body at a side of the first oil pump served as a scavenging pump, the relief passage being for guiding excess oil from the first oil pump to the power generator chamber side.

6. The internal combustion engine for a saddle riding vehicle according to claim 2, wherein the tip end portion of the shift arm is disposed between the pump gear and the second oil pump in a direction along an axis of the pump shaft while overlapping with the second oil pump as seen from a direction along the axis of the pump shaft.

7. The internal combustion engine for a saddle riding vehicle according to claim 2, wherein a power generator chamber for storing a power generator connected to the crankshaft is formed between a power generator cover and the other crankcase half body out of the pair of left and right crankcase half bodies, the power generator cover being joined, from a side opposite to the one crankcase half body, to the other crankcase half body, and a relief passage is formed in the other crankcase half body at a side of the first oil pump served as a scavenging pump, the relief passage being for guiding excess oil from the first oil pump to the power generator chamber side.

8. The internal combustion engine for a saddle riding vehicle according to claim 1,
wherein the
tip end portion of the shift arm is disposed between the pump gear and the second oil pump in a direction along an axis of the pump shaft while overlapping with the second oil pump as seen from a direction along the axis of the pump shaft.

9. The internal combustion engine for a saddle riding vehicle according to claim 1,
wherein a relief valve arranged between the second oil pump rotor and the pump gear in the axial direction of the pump shaft is disposed in the pump cover.

10. The internal combustion engine for a saddle riding vehicle according to claim 9,
wherein an oil filter is disposed in a crankcase cover joined to the one crankcase half body while covering the one crankcase half body, and
a passage for guiding oil to the oil filter is formed in the pump cover of the second oil pump served as a feed pump.

11. The internal combustion engine for a saddle riding vehicle according to claim 1,
wherein a power generator chamber for storing a power generator connected to the crankshaft is formed between a power generator cover and the other crankcase half body out of the pair of left and right crankcase half bodies, the power generator cover being joined, from a side opposite to the one crankcase half body, to the other crankcase half body, and
a relief passage is formed in the other crankcase half body at a side of the first oil pump served as a scavenging pump, the relief passage being for guiding excess oil from the first oil pump to the power generator chamber side.

12. The internal combustion engine for a saddle riding vehicle according to claim 1,
wherein an oil filter is disposed in a crankcase cover joined to the one crankcase half body while covering the one crankcase half body, and
a passage for guiding oil to the oil filter is formed in the pump cover of the second oil pump served as a feed pump.

* * * * *